Nov. 19, 1946.  T. A. COHEN  2,411,248
ELECTRICAL SYSTEM FOR CONTROLLING THE LEVEL OF LIQUID IN CONTAINERS
Filed April 12, 1943  2 Sheets-Sheet 1
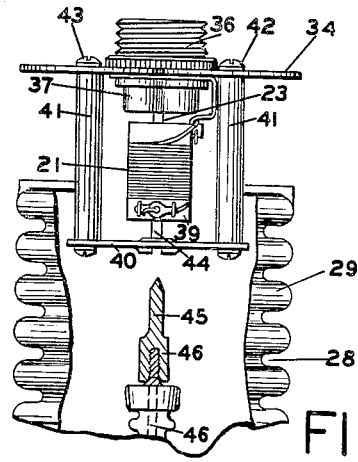
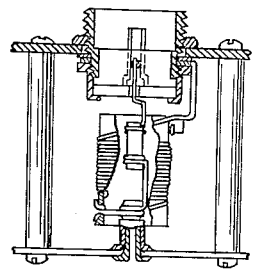
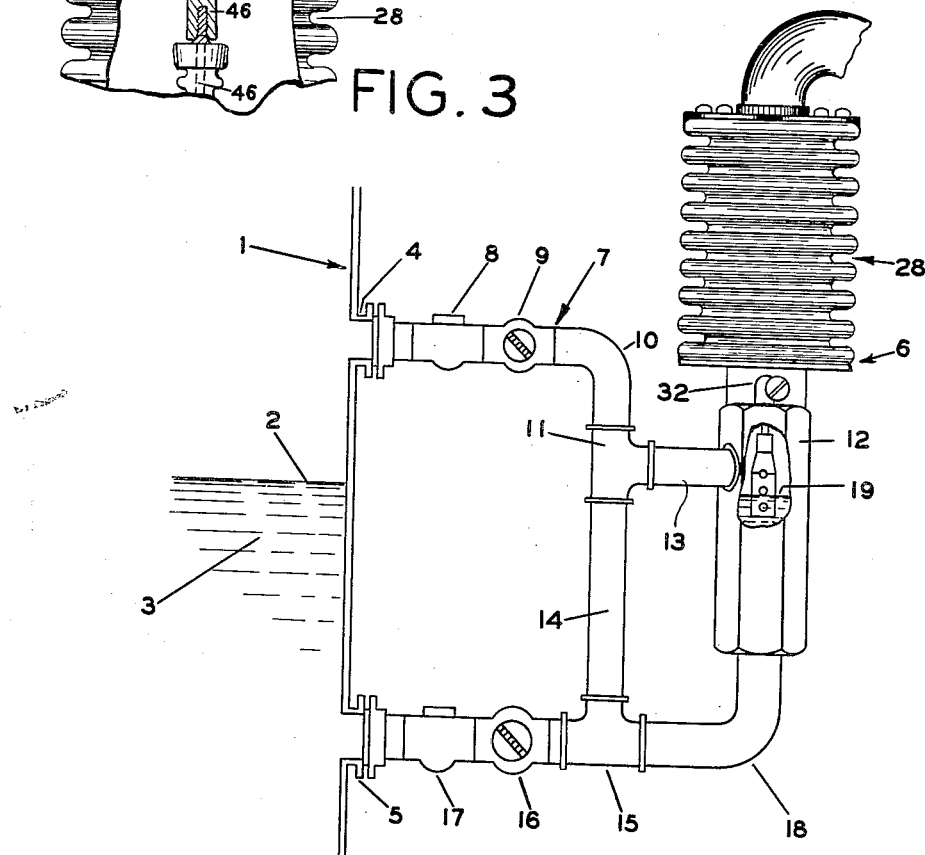
Theodore A. Cohen, INVENTOR,
BY Theodore W. Miller,
His Attorney Patented Nov. 19, 1946

2,411,248

UNITED STATES PATENT OFFICE 2,411,248

ELECTRICAL SYSTEM FOR CONTROLLING THE LEVEL OF LIQUID IN CONTAINERS

Theodore A. Cohen, Chicago, Ill., assignor, by mesne assignments, to Wheelco Instruments Company, Chicago, Ill., a corporation of Illinois Application April 12, 1943, Serial No. 482,812

3 Claims. (Cl. 250—16)

This invention relates to electrical control apparatus.

One of the objects of my invention is to provide an improved apparatus for automatically controlling the liquid level of a container which is under high pressure and temperature.

Another object of this invention is to provide such an apparatus wherein a liquid level responsive impedance change device controls a vacuum tube oscillator circuit in accordance with impedance changes and which apparatus does not require the major portion of the oscillator circuit to be situated in the immediate vicinity of the liquid level responsive device.

Other and further objects of my invention will be apparent hereinafter as the same becomes better understood from an examination of the specification and claims in conjunction with the accompanying drawings wherein:

Figure 1 is an enlarged detail view of the impedance change device and connections therefor to the container, the liquid level in which is to be controlled;

Fig. 2a is a detail view of the grid tank unit.

Figure 3 is a view similar to that of Figure 2 showing a portion of the impedance change device withdrawn slightly from fully assembled position.

Figure 2:
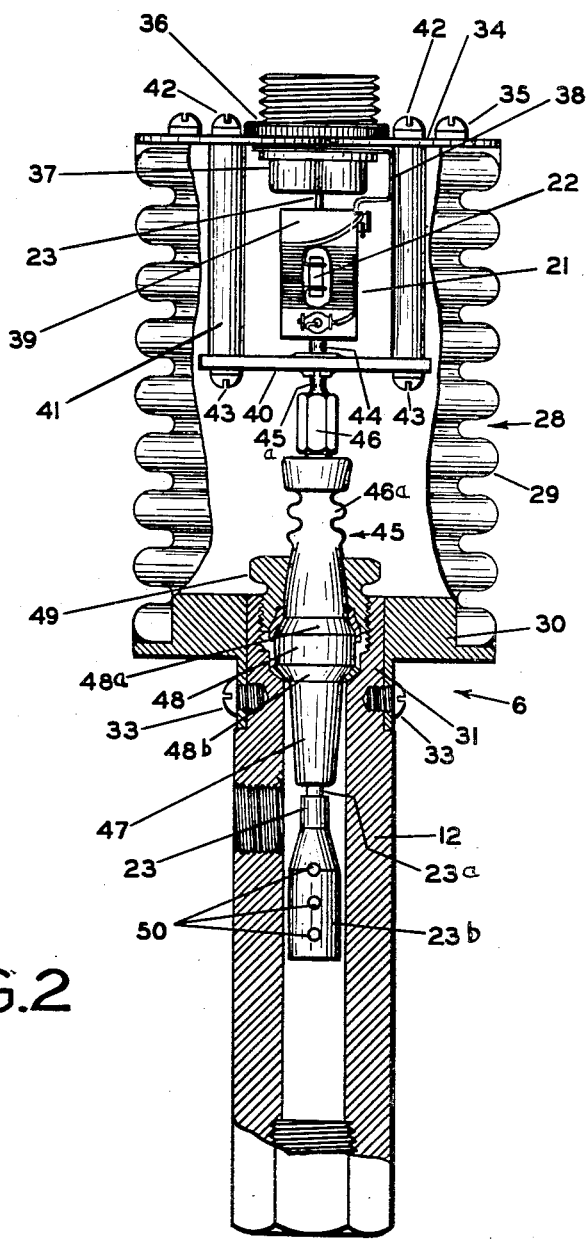
Figure 2 is an enlarged detail view partly in section and partly cut away showing the impedance change device as a self-contained unit.

Referring to the drawings more particularly, reference character 1 designates a container containing a liquid 3 at a level 2. The container 1 (Figure 1) is provided with an opening and a flange 4 above the normal liquid level 2 and a flange 5 for an opening below said normal liquid level. The impedance change device 6 is connected to the upper flange 4 and also to the lower flange 5 for communicating with the container 1 both above and below the liquid level 2 therein. These connections comprise an upper pipe 7 which includes a check valve 8 and a manually operable cock 9, an elbow 10, and a T connection 11. The impedance change device 6 includes a lower vertically extending elongated hollow cylindrical member 12 which is connected at its side to a pipe 13 which is in turn connected to the T 11. The lower end of the T 11 is connected to a vertical pipe 14 which in turn is connected to the central connection on another T 15. The latter T 15 is connected to the flange 5 through a cock 16 and a check valve 17. The right-hand side of the T 15, as shown in Figure 2, is connected through an elbow 18 to the lower end of the member 12. Thus the member 12 communicates both above and below the liquid level of the container 1 for maintaining a liquid level 19 in said member 12 corresponding to the liquid level 2 of the container. The member 12 may be of any suitable cross section but is preferably as shown of angular cross section, such as hexagonal, to facilitate handling in assembly.

The impedance change device 6 includes a grid tank unit comprising an inductance 21 and a capacitance 22 as shown in Figures 3 and 4. This inductance 21 and capacitance 22 are connected together and to an electronic oscillator not shown through the intermediary of a concentric conductor cable. One side of the inductance 21 is connected to a central conductor 23 which extends into the member 12, and the other side of the inductance 21 is connected to ground whereby the lower portion 23b of the conductor 23 extending into the member 12 co-operates with the liquid and the member 12 to act as a capacity change device, the capacity of which varies with the rise and fall of the liquid in said member. The liquid in this case acts as a dielectric.

The inductance 21 and capacitance 22 form a grid tank oscillating circuit which is connected to the grid circuit of an oscillator circuit (not shown), the oscillator circuit having a plate tank which is tuned to predetermined resonant point with the grid tank. The capacity change device comprising the electrode 23—23b, and the grounded member 12 is connected across the inductance 21. The tuning is such as to cause the oscillator to open a relay switch when the liquid level in the container 1 is at pre-chosen level. As long as the relay switch is closed, an electric feed valve continues to supply the container 1 with liquid. As the liquid level rises in the container 1 and in member 12 the capacity between the surfaces of the walls of member 12 and the surfaces of the electrode 23b increases, changing the tuning of the oscillator and de-energizing the relay in the output circuit of the oscillator to open the relay switch and close the electric feed valve. If the liquid level drops below the prechosen control level, the capacity between the surfaces of the walls in member 12 and the surfaces of electrode 23b decreases causing a retuning of the oscillator, energizing the relay in the output circuit of the oscillator and closing the relay switch reopening supply valve. This control process is repeated maintaining liquid at proper level. The mounting of the impedance change device as shown in Figures 2 and 3 is such that it is unaffected by pressure or temperature of the liquid within the container 1 and the member 12. This mounting includes a cylindrical member 28 provided with annular corrugations or fins 29. The lower end of the member 28 is welded to the outer edge of a flanged sleeve member 30 which fits over a reduced portion 31 on the upper end of member 12. As shown in Figure 1 the flanged sleeve member 30 is provided with bayonet slots 32 and is snugly fitted over the portion 31 and removable therefrom when desired for inspection, renewal or repair of parts. Screws 33 co-operate by extending into the portion 31 and engaging the sleeve 30 at the edge of the slots 32.

The upper end of the corrugated member 28 is closed by an annular plate 32 retained on said upper end by screws 35. This plate 34 is centrally apertured co-axially with the member 28 and the member 12 to receive and have mounted thereon a female connector 36 for the grid tank end of the co-axial conductor cable. This connector member 36 is held in position upon the plate 34 by means of a cooperating member 37 threaded thereto beneath said plate. This member 37 acts to clamp a spring clip 38 against the bottom of said plate and in position to support a cylinder 39 in co-axial relation with the conductor 23 and the axis of members 28 and 12. This cylinder 39 forms the support for the grid tank unit comprising inductance 21 and capacitance 22 heretofore referred to. A smaller circular plate 40 of insulating material is mounted beneath the plate 34 within the member 28 and is suspended from said plate 34 by means of elongated members 41 which are connected to the respective plates 34 and 40 by screws 42 and 43, respectively. The plate 40 is provided with a central aperture and has mounted thereon above the central aperture an enlarged hollow extension 44 for the conductor 23. This enlarged hollow extension 44 is adapted to removably receive an upwardly-extending prong 45a on a threaded extension 46 which is removably attached to the upper end of a central electrode 23a.

This central electrode 23a is mounted in a porcelain member 45 which has an upwardly extending corrugated portion 46 of low leakage path characteristics extending within the member 28 and a lower portion 47 extending within the member 12. These portions 46 and 47 are joined by a central enlarged integral portion 48 having opposed tapered seats 48a and 48b. The central electrode 23a is sealed within the porcelain member 45 somewhat in the manner in which the central electrode in an automobile type spark plug is sealed within the porcelain mounting therefor. The enlarged portion 48 of the porcelain member 45 is seated between suitable gaskets in a threaded recess in the upper end of member 12 and is sealed within said recess by a suitable sealing and retaining annular screw bushing 49. The lower end of the electrode 23a is provided with an enlarged extension 23b. This extension 23b is provided with transverse apertures 50 and is so shaped that the capacity of the condenser formed by the surfaces of said extension and the surfaces of member 12 will increase uniformly as the liquid rises, and decrease uniformly as the liquid recedes to in turn affect the tuning of the grid tank unit. The apertures 50 cause rapid draining of the liquid dielectric as it recedes preventing a film remaining on the surface of 23b which might prevent uniform lowering of the capacity, as intended, and consequent interference with true operation. It will be apparent that by virtue of the nature of the sealed mounting for the extended conductor or electrode 23a, extremely high pressures, e. g. upwards of 2,000 lbs. per square inch, within the container 1 and member 12 will not endanger satisfactory functioning of the equipment.

In the use of high pressure liquid level control equipment high temperatures are usually also present. In order to prevent such high temperatures from interfering with the electrical characteristics of the circuit such as inductance 21 and capacitance 22.

The member 28 is provided with the corrugations or fins 29 of thin section and large area so that a minimum of heat will be conducted to the electrical system 21—22 and such heat will rapidly dissipate by radiation and convection from the large corrugated surfaces 29.

By pass system 14, 11 and 13 are designed to prevent the liquid level in the container 12 from ever rising above the top of the electrode 23b with the possibility of coating the skirt 47 of insulator 47 with a film which might prevent true operation of the apparatus. Check valves 8—17 together with manually operable cocks 9—16 allow easily dismounting of the apparatus exteriorly of said cocks from the container 1.

As shown in Figure 3, the plate 34, from which the grid tank unit is suspended, may be readily withdrawn for inspection, renewal or repair of the parts of the grid tank unit. In this connection it will be noted that the ready withdrawal of the grid tank unit is permitted by the fact that prong 45a is slidably inserted in jacket 44. Access to the interior of enclosure 12 and electrode 23b is facilitated by removable collar 49. The operation of the aforedescribed apparatus will be apparent from the above description and by reference to my aforementioned co-pending application without further detail.

I am aware that many changes may be made and details varied without departing from the principles of my invention and I, therefore, do not wish to be limited to the details shown and described.

I claim:

1. The combination of a high pressure enclosure having an inner conducting surface adapted to contain liquid at a predetermined level therein, an electrode extending into the enclosure for cooperation by the walls of the electrode with the liquid and said surface to form a capacity change device wherein the capacity between the walls of the electrode and said surface is varied by the rise and fall of the liquid in accordance with the liquid level, the liquid forming a portion of the electrical capacitance, a non-conducting support for said electrode surrounding the same, the enclosure being provided with an opening and a pressure seal therein for said electrode and support, and a grid tank unit mounted outside said enclosure in spaced relation therewith, and forming an oscillating circuit including said electrode, the mounting for the grid tank unit including an envelope member surrounding the outer end of said electrode and having an opening for receiving the grid tank unit in position upon assembly to readily connect with said electrode.

2. The combination of a high pressure enclosure having an inner conducting surface adapted to contain liquid at a predetermined level therein, an electrode extending into the enclosure for cooperation by the walls of the electrode with the liquid and said surface to form a capacity change device wherein the capacity between the walls of electrode and said surface is varied by the rise and fall of the liquid in accordance with the liquid level changes, the liquid forming a portion of the electrical capacitance, a non-conducting support for said electrode surrounding the same, the enclosure being provided with an opening and a pressure seal therein for said electrode and support, and a grid tank unit mounted outside said enclosure in spaced relation therewith, and forming an oscillating circuit including said electrode, the mounting for the grid tank unit including an annular member surrounding said unit and electrode and having heat radiating fins for preventing heat from interfering with the predetermined characteristics of said unit.

3. The combination of a high pressure enclosure having an inner conducting surface adapted to contain liquid at a predetermined level therein, an electrode extending into the enclosure for cooperation by the walls of the electrode with the liquid and to form a capacity change device wherein the capacity between the walls of electrode and said surface is varied by the rise and fall of the liquid in accordance with the liquid level changes, the liquid forming a portion of the electrical capacitance, a non-conducting support for said electrode surrounding the same, the enclosure being provided with an opening and a pressure seal therein for said electrode and support, a grid tank unit mounted outside said enclosure in spaced relation therewith, and forming an oscillating circuit including said electrode, the mounting for the grid tank unit including an annular member surrounding said unit and electrode and having means for preventing heat from interfering with the predetermined characteristics of said unit.

THEODORE A. COHEN.